United States Patent [19]
Smith

[11] 3,847,757
[45] Nov. 12, 1974

[54] RECOVERING CHROMIUM VALUES FOR STABILIZATION OF TIN-PLATE SURFACES

[75] Inventor: Robert B. Smith, Crown Point, Ind.

[73] Assignee: National Steel Corporation, Pittsburgh, Pa.

[22] Filed: June 4, 1973

[21] Appl. No.: 366,545

[52] U.S. Cl. ............... 204/40, 204/35 R, 204/54 R, 204/54 L, 423/53, 423/54
[51] Int. Cl. ..... C23f 13/00, C23b 5/16, C01g 37/00
[58] Field of Search ......... 423/54, 53; 204/35 R, 40

[56] References Cited
UNITED STATES PATENTS
3,681,210 8/1972 Zievers et al. .................... 204/35 R OTHER PUBLICATIONS
J. M. Culotta and W. F. Swanton, "Case Histories of Plating Waste Recovery Systems," Plating, March 1970, pages 251–255.

Primary Examiner—John H. Mack
Assistant Examiner—Aaron Weisstuch
Attorney, Agent, or Firm—Shanley & O'Neil

[57] ABSTRACT

Chromium values are recovered from wash water following a chemical treatment step in electrotinplating lines in a process comprising treating in a cation exchange zone, treating in an anion exchange zone, regenerating the anion exchange zone, treating effluent from said regeneration in a cation exchange zone and passing effluent from the cation exchange zone to a storage zone, passing effluent from said regeneration to the storage zone without intermediate cation exchange treatment.

16 Claims, 2 Drawing Figures

{ 3,847,757 }

RECOVERING CHROMIUM VALUES FOR STABILIZATION OF TIN-PLATE SURFACES

BACKGROUND OF THE INVENTION

This invention relates to the recovery of hexavalent chromium values from wash water following a chemical treatment step in electrotinplating lines. Such allows practical use for chemical treatment of chromium values which would otherwise be lost.

Electrolytically produced tin-plate is treated in a surface stabilizing process to inhibit surface reaction which is objectionable not only from an appearance standpoint (discoloration) but also because it can cause poor adhesion of lacquer and lithographing ink and affect solderability. One conentional type of surface stabilizing process involves electrolytic treatment utilizing an acidic aqueous solution of sodium dichromate. This type of process is disclosed, for example, at pages 1016 and 1017 of *The Making, Shaping and Treating of Steel* (9th edition) and in U.S. Pat. Nos. 2,606,866 and 3,138,548 and 3,313,714 and is the type of process to which this invention is relevant. This type of process is referred to herein alternatively as "chemical treatment" or "electrochemical treatment."

Subsequent to chemical treatment, hexavalent chromium values are residual in solution wetting the tinplate. While methods have been disclosed to recover chromium values from solution residually wetting plated articles (See, for example Paulson et al., *Plating*, pages 1005–1009, Sept., 1953; Culotta et al., *Plating*, pages 251–255, Mar., 1970; Zievers et al. U.S. Pat. No. 3,658,470; and applications of Robert B. Smith and Robert B. Smith and R. K. Dickey filed concurrently herewith), none of these methods is particularly directed at recovering chromium values from tin-plate after chemical treatment in a form suitable for use for such chemical treatment.

It is an object of this invention to provide a novel process specifically tailored to the above end.

This object and others will be evident from the following detailed description.

DETAILED DESCRIPTION

Figure 1:
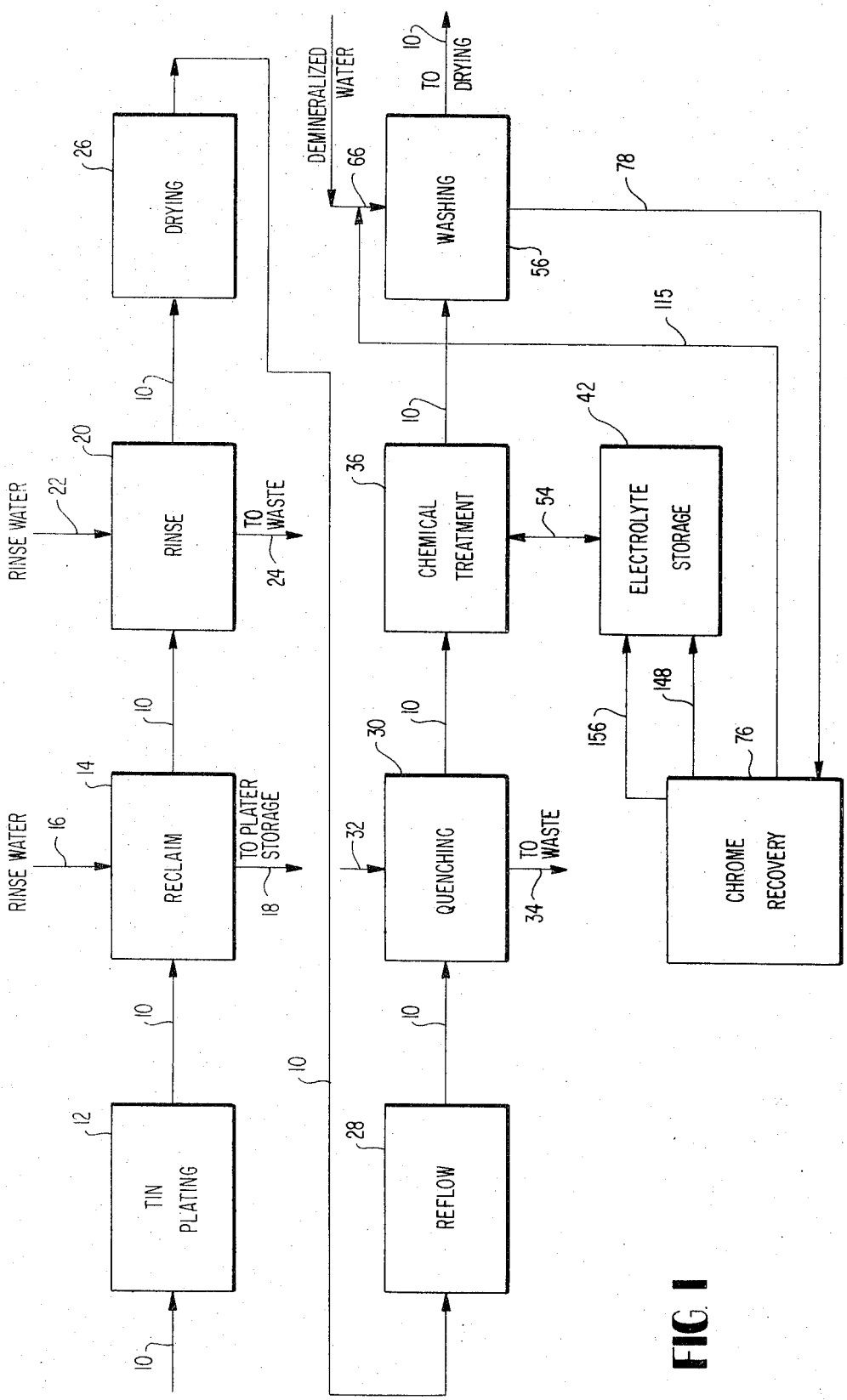
FIG. 1 is a flowsheet diagrammatically depicting an electrotinplating line including a chrome recovery method within the scope of the resent invention.

With continuing reference to FIG. 1 of the drawings, steel strip having been preliminarily treated, for example in electrolytic cleaning and pickling steps, follows a travel path 10 and is subjected to a tinplating step 12. This tinplating step can employ for example a halogen-type electrolyte such as, for example, an aqueous stannous fluoride solution containing minor amounts of additives. In such case, a plurality of tanks or plater cells are utilized, and the strip passes through these tanks in series. Each tank has a conductor roll which maintains the strip cathodic and the tanks contain grids which are anodic. The strip follows a horizontal travel path through each tank and is barely immersed in the electrolyte and is plated on the bottom side only in its passage through a tank. After the strip has passed through a number of the tanks, the travel path turns upward and the strip direction is reversed so that the original top of the strip becomes the bottom whereby both sides of the strip are plated.

Subsequent to the tinplating 12, the strip is treated in a reclaim step 14. In this reclaim step, rinse water as denoted by arrow 16 is added into a tank denoted a reclaim tank, and the strip is passed through the rinse water to recover plating solution residually wetting the strip. The resulting rinse solution is drained to plater storage, that is to the storage tank for plating electrolyte, as denoted by arrow 18.

The strip is then subjected to a rinsing step 20. In this step, plating solution still residual on the strip is rinsed therefrom. Rinse water provision is denoted by arrow 22. Resulting rinse solution is disposed to waste as indicated by arrow 24.

The strip then progresses along travel path 10 through a drying step 26.

Subsequent to the drying step 26, the strip continues along travel path 10 and passes through a reflow step 28. In this step, the strip is passed through a reflow tower where it is subjected to radio frequency energy to melt the electrodeposited tin.

Following passage through the reflow step, the strip passes through a quenching step 30. In this step the strip is passed through a quench tank containing water sprays and also containing a body of liquid; the water line to the sprays is denoted by arrow 32. Passage of the strip by the sprays and through the liquid controls the rate of freezing of the tin layer to produce the desired alloy coating and enhance brightness. The resulting solution is disposed to waste as denoted by arrow 34.

Following the quenching step, the strip is subjected to a chemical treatment step 36 where a hexavalent chromium oxide coating is applied by electrolytic action to stabilize the surface of the tinplate.

Figure 2:
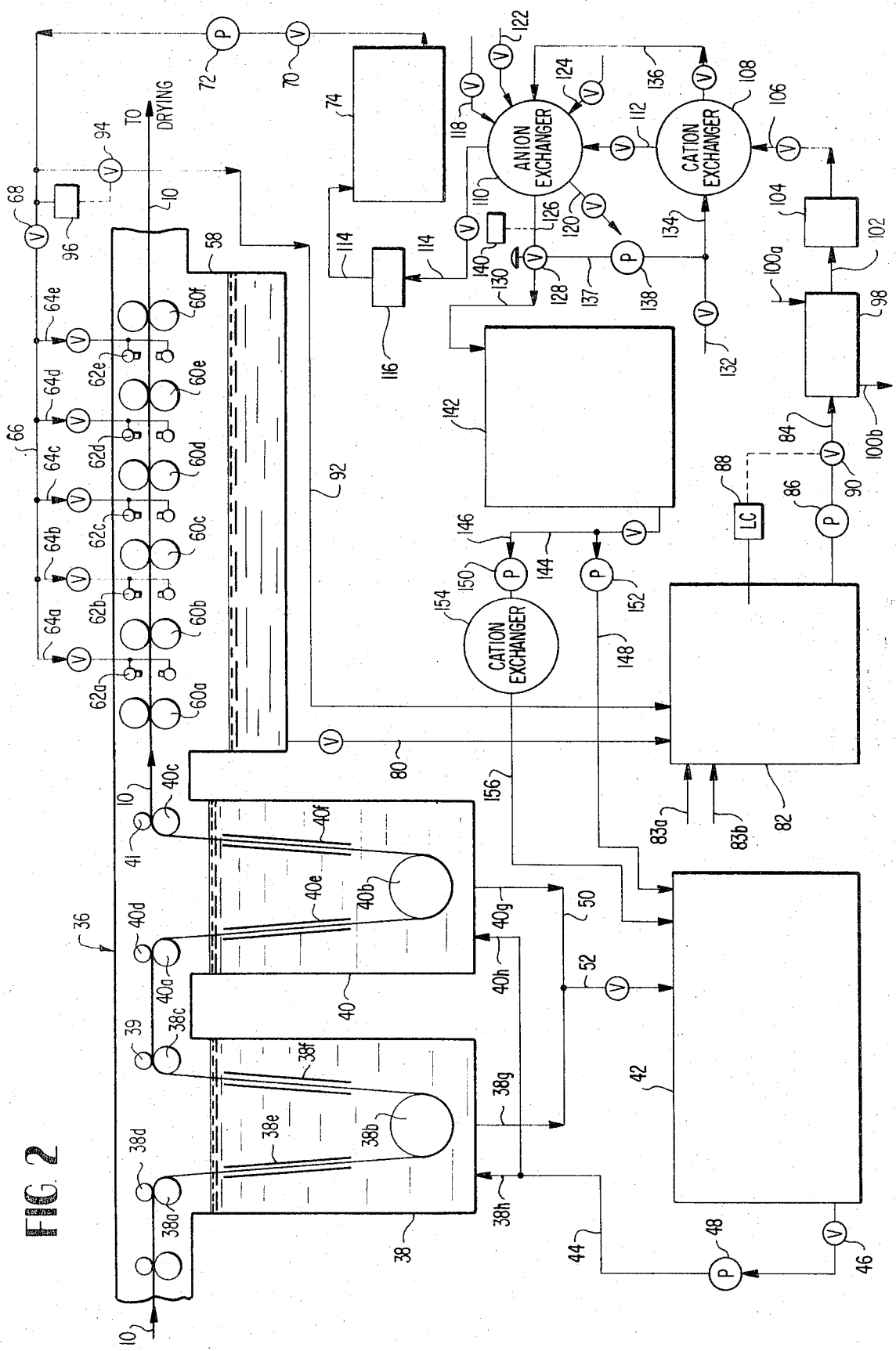
FIG. 2 is a flowsheet depicting in detail a portion of the flowsheet of FIG. 1 including chemical treatment, washing subsequent thereto and chromium recovery.

The chemical treatment step is depicted in detail in FIG. 2. In this step the strip follows a travel path in series through two chemical treatment tanks denoted 38 and 40. The strip approaches each of the tanks 38 and 40 in a substantially horizontal plane, then passes over a contact roll and advances downwardly, then passes under a sink roll and advances upwardly, then passes over another contact roll and leaves the tank in a substantially horizontal plane. The contact rolls at the strip entrance sides of tanks 38 and 40 are respectively denoted 38*a* and 40*a;* the sink rolls are respectively denoted 38*b* and 40*b;* and the contact rolls at the exit sides of the tanks are respectively denoted 38*c* and 40*c*. The contact rolls 38*a*, 38*c*, 40*a*, 40*c* perform a deflecting function and also render the strip cathodic. Snubber rolls 38*d* and 40*d* at the entrance sides of the tanks 38 and 40 and snubber rolls 39 and 41 at the exit sides of tanks 38 and 40 force the strip against adjacent contact rolls to provide good contact.

In each of the tanks 38 and 40, there are two sets of anodic grids with one of the sets being between the contact roll at the entrance of a tank and a sink roll and the other set being between a sink roll and the contact roll at the exit of a tank so that the strip passes through one set of grids on its downpass through a tank and through the other set on its up pass. The grids for the downpass are respectively denoted 38*e* and 40*e*, and the grids for the up pass are respectively denoted 38*f* and 40*f*.

The electrolyte in each of the tanks is an aqueous solution of sodium dichromate at a concentration expressed as grams of $CrO_3$ per liter ranging from 20 to 40 and preferably from 25 to 35. The pH of the electrolyte ranges from 2 to 6, preferably from 3 to 4 and most preferably is 3.5. The electrolyte is made up initially by adding sodium dichromate in solid form to water and adjusting the pH with chromic acid; if the pH is adjusted too far sodium hydroxide is utilized to bring the pH to the desired level.

The electrolyte is introduced into the chemical treatment tanks 38 and 40 from an electrolyte storage tank 42 (FIGS. 1 and 2), and recirculation is carried out between tank 42 and the tanks 38 and 40. This recirculation provides stability in the electrolyte composition in tanks 38 and 40 and dissipation of heat building up in the system from the operation of the grids 38$e$, 38$f$, 40$e$, 40$f$. The portion of the recirculation loop providing means for flow of liquid from tank 42 to tanks 38 and 40 consists of a line 44 containing a valve 46 and a pump 48 which communicates at its upstream end with tank 42 and lines 38$h$ and 40$h$ which communicate at their upstream ends with line 44 and respectively communicate at their downstream ends with tanks 38 and 40. The portion of the recirculation loop providing means for flow of liquid from tanks 38 and 40 to tank 42 consists of lines 38$g$ and 40$g$ which respectively communicate at their upstream ends with tanks 38 and 40, line 50 which communicates with the downstream ends of lines 38$g$ and 40$g$, and a valved line 52 which provides communication between line 50 and tank 42. The recirculation comprises pumping of liquid by pump 48 from tank 2 through lines 44, 38$h$ and 40$h$ into tanks 38 and 40 and the gravity draining of liquid from tanks 38 and 40 via lines 38$g$ and 40$g$, line 50 and line 52 to tank 42. The recirculation between tank 42 and chemical treatment tanks 38 and 40 of chemical treatment step 36 is denoted on FIG. 1 by arrow 54.

Subsequent to chemical treatment the strip follows travel path 10 through a spray washing step 56 whereby electrolyte from the chemical treatment step residual on the strip is washed therefrom and recovered.

The spray washer for step 56 is depicted in detail in FIG. 2. It comprises an elongate tank 58. The strip follows a travel path 10 over the tank. The strip path over the tank is a straight line path and is horizontally oriented. There are six sets of wringer rolls equally spaced along the length of the tank that guide the strip over it. These sets of wringer rolls are respectively denoted 60$a$, 60$b$, 60$c$, 60$d$, 60$e$ and 60$f$ with 60$a$ being near the entrance of the spray washer, followed by 60$b$, followed by 60$c$, followed by 60$d$, followed by 60$e$, followed by 60$f$ near the exit of the spray washer.

Between successive sets of wringer rolls are two spray nozzles, one below the strip and one above the strip so that the strip is sprayed from above and below. The spray nozzles between rolls 60$a$ and 60$b$ are denoted 62$a$; those between 60$b$ and 60$c$ are denoted 62$b$; those between rolls 60$c$ and 60$d$ are denoted 62$c$; those between rolls 60$d$ and 60$e$ are denoted 62$d$; and those between 60$e$ and 60$f$ are denoted 62$e$. Valved conduits 64$a$, 64$b$, 64$c$, 64$d$ and 64$e$ respectively communicate with nozzles 62$a$, 62$b$, 62$c$, 62$d$ and 62$e$. Each of these conduits communicates at its upstream end with a demineralized water feed conduit 66 containing valves 68 and 70 with a pump 72 therebetween. Line 66 communicates at its upstream end with a demineralized water storage tank 74.

The demineralized water sprayed from nozzles 62$a$, 62$b$, 62$c$, 62$d$ and 62$e$ washes residual solution containing hexavalent chromium from the strip and falls into the lower portion of tank 58 providing a body of liquid in that portion.

The strip exiting from the spray washer is dried and coiled.

The solution recovered from the washing step 56, that is the solution accumulating in the bottom of tank 58 is passed to a chrome recovery step 76 (FIG. 1) as indicated by arrow 78.

This chrome recovery step is depicted in detail in FIG. 2. In this step, wash solution accumulating in the bottom of tank 58 flows therefrom through valved line 80 into a collection tank 82. The aqueous solution flowing through conduit 80 contains cations including sodium ions and for example iron and trivalent chromium ions and also contains anions containing hexavalent chromium (dichromate ions) and has a concentration of hexavalent chromium (in the form of anions) expressed as $CrO_3$ ranging from about 0.15 to about 0.4 grams per liter.

Inlet lines 83$a$ and 83$b$ also communicate with tank 82. Wash solution from a chrome plating line can be introduced through line 83$a$. Other aqueous solutions containing hexavalent chromium in the form of anions, for example from the draining or washing of tanks in a chrome plating system can be metered into tank 82 through line 83$b$.

In the case where liquid is introduced into tank 82 not only through line 80 but also as described in the above paragraph, the liquid in tank 82 is an aqueous solution containing cations and preferably having a concentration of hexavalent chromium (in the form of anions) expressed as $CrO_3$ per liter ranging from about 0.25 to about 0.5.

The tank 82 has an exit line 84. Solution is pumped from the tank 82 by a pump 86 and the amount of flow is in response to a level control 88 operating a valve 90. The pump 86 runs continuously, and the level control operates to close the valve more if the level in the tank drops. This setup operates to provide continuous flow through line 84.

A system is provided to ensure continuous flow through line 84 even if the tinplating line is shut down and no low is being provided through lines 83$a$ and 83$b$. This system comprises a conduit 92 which communicates at its upstream end with line 66 at a point upstream of valve 68 and communicates at its downstream end with tank 82. The line 92 contains a valve 94 which operates in response to a controller 96 operating in response to the pressure in line 66 upstream of valve 68. When the tinplating line is shut down, the valve 68 is closed and the pressure sensed upstream of valve 68 rises whereby controller 96 signals valve 94 to open whereby demineralized water is fed into tank 82. This assures continuous flow into collecting tank 82 so chrome laden mix in the collecting tank 82 will be continuously pumped therefrom even though no aqueous chromium-containing solution is being introduced into tank 82.

The solution from line 84 is flowed through heat exchanger 98 where it is cooled against the countercurrent flow of cold water as denoted by arrows 100$a$ and 100$b$. Cooling is to a temperature suitable for treatment of the solution in the ion exchange system which is described below.

Solution leaves the exchanger 98 via a line 102 and passes through a filter 104 which removes particles of solid material. The filtered solution flows through a valved line 106 into an ion exchange system which is described below. Treatment in this ion exchange system has the effect of concentrating the solution to provide a more concentrated solution of hexavalent chromium in the form of anions as described hereinafter.

The ion exchange system referred to in the above paragraph comprises a set of ion exchangers consisting first of a cation exchanger defining a first cation exchange zone and then of an anion exchanger defining an anion exchange zone. The cation exchanger is denoted by reference numeral 108. The anion exchanger is denoted by reference numeral 110. A valved line 112 communicates between cation exchanger 108 and anion exchanger 110. Preferably a plurality of sets of ion exchangers are provided so that one or more sets can be on line during regeneration of a set of exchangers.

Resins for use in the cation exchanger 108 are of the strong acid type and are in the hydrogen form. They contain sulfonic acid functional groups and are prepared, for example, by the nuclear sulfonation of styrene-divinylbenzene. Suitable cation exchange resins are, for example, Amberlite IR–120 or Amberlite IR–120 Plus manufactured by Rohm & Haas Company.

The ion exchange resin for use in the anion exchanger 110 is a strong base anion exchange resin of the quarternary ammonium type. It is utilized in the hydroxide form. A suitable resin is Amberlite IRA–900 which is supplied in the chloride form and is converted to the hydroxide form for use; it is available from Rohm & Haas Company.

When solution flows from line 106 into exchanger 108, the cation exchanger takes out cations including sodium ions, trivalent chromium ions and iron ions and replaces them with hydrogen ions. Effluent from the cation exchanger is an aqueous solution comprising hydrogen ions and anions including anions containing hexavalent chromium.

Effluent from the cation exchanger 108 flows into the associated anion exchanger 110. The anion exchanger takes out hexavalent chromium in the form of anions (e.g., dichromate ions) and other anions and replaces these with hydroxyl ions. Effluent from the anion exchanger is demineralized water.

A valved exit line for flow of effluent from anion exchanger 110 is denoted by reference numeral 114. Included in line 114 is a device 116 for deaerating the demineralized water. The demineralized water effluent flows from line 114 into storage tank 74. Flow of demineralized effluent from the anion exchanger and use thereof for the washing step 56 is represented on FIG. 1 by arrow 115.

When the set of ion exchange units is to be regenerated, it is isolated from flow through line 106 by closing the valve in line 106 and isolated from the demineralized water system by closing the valve in line 114.

Regeneration of the cation exchange unit in a set of units is carried out for example as suggested by the manufacturer of the particular resin utilized. Such regeneration involves for example, backwashing, introducing 10 percent sulfuric acid as a regenerating agent and rinsing.

Regeneration of an anion exchange unit involves a regeneration cycle comprising backwashing, removal of residual backwash water, introduction of regeneration agent, removal of resulting solution, introduction of rinse water and removal of resulting solution, introduction of water and recirculation. The regeneration is carried out to produce an aqueous effluent comprising cations (from the regenerating agent) and a concentration of hexavalent chromium in the form of anions substantially higher than the relatively low concentration in line 80 or in tank 82 and in particular comprising a concentration of hexavalent chromium in the form of anions such that when treated as described hereafter electrolyte suitable for use in the chemical treatment step is provided. Regeneration of the anion exchanger is described in detail below.

Backwashing of the anion exchange unit is carried out to fluff up the resin and remove extraneous solids and resin ines from the resin bed to permit good contact between the resin and regenerating agent so that regeneration is carried out efficiently. Backwash water having cations removed therefrom, for example by passage through the cation exchanger being regenerated is introduced into the bottom of the anion exchange column (the flows other than backwash flows through the various ion exchange columns herein are from the top as is conventional; however, the direction of flow constitutes no part of the present invention). A valved line 118 is provided for the introduction of backwash water, and a valved line 120 is provided for outlet of the backwash water. When backwashing has been completed, the valve in line 118 is closed. Residual backwash water is removed from the anion exchanger utilizing a pressurized air purge. A valved air supply line 122 supplies pressurized air for this purpose. Solution leaves the column during backwashing and during the subsequent air purging via backwash outlet line 120 and is routed to waste disposal.

After backwash water has been so purged, pressurized air flow is stopped by closing the valve in line 122, and the valve in the backwash outlet line 120 is closed. The anion exchanger 110 is then vented to the atmosphere by means of a valve not depicted. Then, regenerating agent is flowed into the anion exchanger. A valved supply line 124 is provided for this purpose. The regenerating agent is an aqueous solution of sodium hydroxide. Preferably, the regenerating agent is sodium hydroxide utilized in aqueous solution at a concentration of 10 percent by volume. The regenerating agent reacts with a resin to provide resin in the hydroxide form and release anions containing hexavalent chromium and produce sodium salts containing hexavalent chromium in a negative radical, that is sodium chromate and sodium dichromate. The amount of sodium hydroxide introduced is based on calculations of how much chromium entered and therefore is in a particular column, with a sufficient amount being added so that when solution is removed from the column as described hereinafter, it will contain from about 90 to about 95 percent of the hexavalent chromium in the column just prior to initiation of regeneration. When the appropriate amount of regenerating agent has been introduced, flow of such into the column is stopped, and liquid is forced from the column utilizing a pressurized air purge. The pressurized air for the air purge is supplied through line 122. When the air purge has forced the liquid from the column that is readily removed thereby, air introduction is continued and rinse water is simultaneously routed into the column for a predetermined time and is forced therefrom by the pressurized air. Rinse water flow is provided through piping described below. The streams leaving the column both as a result of purging the liquid in the column from introduction of regenerating agent and as a result of purging liquid from rinse water introduction make up the effluent of regeneration. These streams leave the column through line 126 and comprise an aqueous solution containing sodium ions and anions containing hexavalent chromium. Thus, sodium hydroxide is introduced to provide an aqueous effluent from the column containing cations (sodium ions) and from about 90 to about 95 percent of the hexavalent chromium present in the anion exchange column just prior to initiation of regeneration and to leave in the anion exchange column the remainder of the cations (sodium ions) and hexavalent chromium. Preferably, the amount of hexavalent chromium removed from the column in the effluent is about 95 percent of the present just prior to initiation of regeneration.

The exit line 126 communicates with a three-way valve 128. During forcing of effluent of regeneration from the anion exchange column, the three-way valve 128 is positioned so as to route liquid into a line 130.

After the effluent of regeneration has left the anion exchange column and been routed to line 130, the pressurized air supply is stopped by closing the valve in line 122, but water introduction is continued to fill the column and simultaneously with shutting off of the air supply, the three-way valve 128 is repositioned so as to connect line 126 into a recirculation loop described below. Piping for this water introduction as well as the rinse water introduction to provide part of the effluent of regeneration comprises a valved water supply line 132 which communicates with an entrance line 134 into cation exchanger 108. The piping for the water addition system also includes a valved conduit 136 connecting exchanger 108 and exchanger 110. Thus, in introducing water into anion exchanger 110, the water from line 132 passes through line 134, then passes through cation exchanger 108, then through line 136 and into anion exchanger 110 to fill the same. The passage of the water through the cation exchanger prior to entry into the anion exchanger provides the advantage of removing cations from the water including divalent cations such as calcium and magnesium ions so that service water can be utilized without danger of hardness in the water clogging the exchanger system. In other words, the water can be drawn from a source of water containing divalent cations (for example, calcium and magnesium ions) since these cations are removed prior to entry of water into the anion exchanger.

Once the anion exchange column 110 has been filled with water, water introduction is stopped by closing the valve in line 132, the vent valve (not depicted) is closed, and recirculation between anion exchange column 110 and cation exchange column 108 is started. The recirculation loop between the columns consists of line 126, a line 137 containing a pump 138, valve 128 communicating with lines 126, 128 and 137 and positioned to provide flow between line 126 and line 137, line 134 communicating at its upstream end with the downstream end of line 137, and line 136. To carry out recirculation the pump 138 is operated. Recirculation is carried out between the anion exchanger and the cation exchanger in the recirculation loop until anions including the hexavalent chromium containing anions in the anion exchanger react with the anion exchange resin in that exchanger and cations react with the resin in the cation exchanger. A conductivity sensor 140 is provided sensing in line 126 to indicate when reaction has been completed.

After reaction has been completed, recirculation is stopped by stopping pump 138.

Preferably, the regeneration cycle including backwashing, air purging, introduction of regenerating agent, removal of resulting solution, introduction of rinse water and removal of resulting solution, introduction of water and recirculation is carried out automatically so that the various valves, including the valves in lines 118, 120, 122, 124, 132, 136 and valve 128 are operated automatically in accordance with a predetermined schedule.

The hexavalent chromium containing liquid passing through line 130 flows into a holding tank 142 defining a collection zone and is recovered therein. This liquid comprises an aqueous solution conaining sodium ions and anions containing hexavalent chromium with the concentration of anions containing hexavalent chromium expressed as $CrO_3$ ranging from 20 to 40 grams per liter, preferably from 25 to 35 grams per liter; this is a relatively high concentration compared to the concentrations of $CrO_3$ in line 80 and tank 82.

The effluent of regeneration recovered in tank 142 is passed from that tank via valved line 144 and is apportioned to produce a first stream through a pipe 146 and a second stream through a pipe 148. The apportionment is carried out by the metering pumps 150 and 152 which are respectively in lines 146 and 148. The apportionment is made on the basis specifically described hereinafter.

The line 146 communicates at its downstream end with a cation exchanger 154 and thus directs the first stream through this cation exchanger. Effluent from the cation exchanger passes into storage tank 42 via line 156. When the liquid passes through the cation exchanger 154, cations in the liquid react with resin in the exchanger and are exchanged for hydrogen ions, and the effluent from the cation exchanger is an aqueous solution of chromic acid containing, for example, 20 to 40 grams per liter of chromic acid expressed as $CrO_3$, preferably 25 to 35 grams per liter.

The ion exchange resin utilized in exchanger 154 is of the strong acid type and is used in the hydrogen form. It contains sulfonic acid functional groups in a polymer matrix and is prepared, for example, by the nuclear sulfonation of styrene-divinylbenzene. The resin utilized can be for example Amberlite 200 manufactured by Rohm & Haas; this resin is sold in the sodium form and is converted to the hydrogen form for use.

The line 148 communicates at its upstream end with storage tank 42 so that the second stream described above passes through that line into the electrolyte storage zone defined by tank 42 without an intermediate cation exchange treatment.

The apportionment between the first stream and the second stream, that is between lines 156 and 148 is carried out to provide a pH ranging from 2 to 6 preferably from 3 to 4 and most preferably a pH of 3.5 in the electrolyte storage zone. At such pH, the chromium containing anions are mostly in the form of dichromate. Thus, the apportionment is carried out to provide an aqueous solution of sodium dichromate at a concentration and a pH the same as that of the electrolyte for the chemical treatment step.

The process of this invention is illustrated in the following specific example.

EXAMPLE

The system of FIGS. 1 and 2 is utilized and is generally operated as described above.

More particularly, steel strip (36 inch width) is treated, and line speed through the system is 2,000 feet per minute.

The electrolyte in tanks 38 and 40 is an aqueous solution of sodium dichromate at a concentration of about 30 grams per liter expressed as $CrO_3$. It has a pH of 3.5. The electrolyte is initially prepared by adding sodium dichromate to water and adjusting the pH with chromic acid.

A total of 100 gallons per minute of demineralized water is sprayed through the sprays in washer 58. In other words, 20 gallons per minute is sprayed through each set of sprays 62a, 62b, 62c, 62d and 62e. The water is at 180° F.

A hundred gallons per minute leaves washer 58 through line 80. It has a concentration of hexavalent chromium in the form of anions of about 0.25 grams per liter expressed as $CrO_3$.

The collecting tank 82 receives not only the 100 gallons per minute from washer 58 but also receives aqueous solution containing hexavalent chromium in the form of anions from a washer in a chrome plating line and from other parts of the chrome plating line (for example, from tanks drained for cleaning). The tank 82 thus contains an aqueous solution containing hexavalent chromium in the form of anions at a concentration of 0.4 grams per liter expressed as $CrO_3$.

Tank 82 is a 6,000 gallon tank. Controller 88 operates valve 90 to maintain a continuous stream of liquid through pipe 84. The heat exchanger 98 operates to cool the liquid from 84° to 100° F.

The solution is routed to cation exchanger 108. This exchanger and each of the other exchanger systems is 10 feet high and 54 inches in diameter and is of the conventional type where the ion exchange resin is maintained upon a screen which is positioned in the bottom of the exchanger, the exchanger is vertically oriented and the solution to be treated enters the top and leaves the bottom. The ion exchange resin utilized in exchanger 108 is Amberlite IR-120 Plus, and it is utilized in the hydrogen form.

The anion exchanger 110 contains as an ion exchange resin Amberlite IRA-900. This resin is supplied in the chloride form and is converted to the hydroxide form for use.

When the exchangers 108 and 110 are ready to be regenerated they are taken out of the line, and exchangers containing fresh or regenerated resin are substitued in.

The cation exchanger taken out of the line is regenerated in a cycle comprising backwashing, then treating with a regenerating agent consisting of 10 percent aqueous sulfuric acid and then rinsing. Flow rates and times are in accordance with manufacturer's recommendations.

The anion exchanger which is taken out of the line is regenerated first by backwashing for 10 minutes utilizing service water having cations removed therefrom introduced through line 118. When the 10-minute time period has ended, the valve in line 118 is closed automatically; then the valve in air line 122 is opened and the residual backwash water is forced from the anion exchanger through line 120. After the valve for air purging has been opened for 10 minutes, it automatically closes and the anion exchanger is automatically vented to the atmosphere. Then the valve in line 124 opens. The regenerating agent utilized is aqueous sodium hydroxide solution containing 10 percent sodium hydroxide by volume. Four hundred gallons of regenerating agent is introduced over a 40 minute time period. At this point, the valve in the regenerating agent introduction line automatically closes, the valve in air supply line 122 is opened, and three-way valve 128 is automatically positioned to route liquid to tank 142. After 10 minutes, the air has forced substantially all of the liquid from the ion exchange column. At this point the valves in lines 132 and 136 automatically open whereby water passes through cation exchanger 108 and then into the anion exchanger 110. The water is introduced at a rate of 60 gallons per minute. After 1 minute, the valve in line 122 is closed to shut off the air. The 60 gallons of water introduced before the air is shut off serves to rinse out residual solution heavily laden with chrome and carry it to tank 142. The 460 gallons routed to tank 142 contain 95 percent of the hexavalent chromium which was in the resin in the column 110 just prior to initation of regeneration.

When the air is shut off, the three-way valve 128 is automatically repositioned to recirculation position (that is, to provide communication between lines 126 and 137) and water introduction is continued to fill the column. Then water introduction is automatically stopped by means of a conductivity switch, the vent valve closes, and pump 138 is automatically started and recirculation between the anion exchanger 110 and the cation exchanger 108 is carried out. This recirculation is continued until the conductivity cell 140 registers 25 micromhos thereby indicating reaction of the sodium chromates and dichromates with the resin to establish a level of chromate and dichromate in the anion exchange resin.

The solution recovered in tank 142 is an aqueous solution comprising sodium ions and anions containing hexavalent chromium at a concentration of 30 grams per liter expressed as $CrO_3$. The pumps 150 and 152 are metering pumps and apportion the liquid from line 144 so that 75 percent passes through line 146 and 25 percent passes through line 148.

The cation exchange resin in exchanger 154 is Amberlite 200 which has been converted to hydrogen form. Passage of the solution through exchanger 154 removes cations and the effluent is aqueous chromic acid solution.

The apportionment between lines 146 and 148 provides in tank 42 an acidic aqueous solution of sodium dichromate having a pH of 3.5. The solution produced as a result of flow from lines 148 and 156 is suitable for use as electrolyte in the chemical treatment tanks 38 and 40.

The phrases "hexavalent chromium in the form of anions" and "anions containing hexavalent chromium" are used interchangeably herein. The term "chromic acid" is used herein in a sense broad enough to include dichromic acid.

The invention may be embodied in other specific forms without departing from the spirit or essential characteristics thereof. For example, the source of the aqueous solution in tank 82 can be exclusively from a line other than an electrotinplating line; for example, the source could exclusively be the effluent from a washer on a chrome plating line. In other words, any source can be utilized for aqueous solution containing hexavalent chromium in the form of anions for tank 82 as long as the concentration of hexavalent chromium is relatively low, for example, less than 10 grams per liter expressed as $CrO_3$. Moreover, instead of continuous flow through both lines 146 and 148, flow through each of the lines can be intermittent with flow through each of the lines being at the same time or at different times so long as the composition including the concentration and pH of the electrolyte is maintained. Therefore, in view of the variations that are readily understood to come within the limits of the invention, such limits are defined by the scope of the appended claims.

I claim:

1. Method of recovering hexavalent chromium from solution wetting tin plate surfaces after electrochemical treatment utilizing as an electrolyte an acidic aqueous solution comprising sodium dichromate, comprising the steps of
   a. washing said surfaces to recover an aqueous solution containing cations and anions including anions containing hexavalent chromium;
   b. treating aqueous solution recovered from said washing step with cation exchange resin in a cation exchange zone to replace cations with hydrogen ions to produce an aqueous effluent containing hydrogen ions and anions including anions containing hexavalent chromium;
   c. treating said effluent with anion exchange resin in an anion exchange zone to replace anions with hydroxyl ions thereby recovering hexavalent chromium in the resin in said anion exchange zone and producing a demineralized water effluent;
   d. regenerating the resin in said anion exchange zone to produce an effluent from said anion exchange zone comprising an aqueous solution containing sodium ions and anions containing hexavalent chromium;
   e. treating effluent from step (d) with cation exchange resin in a cation exchange zone to replace cations with hydrogen ions and produce an effluent and passing the produced effluent into an electrolyte storage zone;
   f. passing effluent from step (d) into the electrolyte storage zone without an intermediate cation exchange treatment.

2. Method as recited in claim 1 in which the steps (e) and (f) are carried out to provide a pH ranging from 2 to 6 in said electrolyte storage zone.

3. Method as recited in claim 2 in which steps (e) and (f) are carried out to provide a pH ranging from 3 to 4 in said electrolyte storage zone.

4. Method as recited in claim 3 in which steps (e) and (f) are carried out to provide a pH of 3.5 in said electrolyte storage zone.

5. Method as recited in claim 1 in which said regeneration step is carried out to provide in the effluent from the regenerating step a concentration of anions containing hexavalent chromium expressed as grams of $CrO_3$ per liter ranging from 20 to 40.

6. Method as recited in claim 5 in which said concentration ranges from 25 to 35.

7. Method as recited in claim 6 in which said effluent from the regneration step is recovered in a collecting zone prior to being subjected to steps (e) and (f).

8. Method as recited in claim 1 in which said regeneration is carried out to provide effluent from said anion exchange zone containing from about 90 to about 95 percent of the hexavalent chromium present in said anion exchange zone just prior to initiation of regeneration and in which water is introduced into said anion exchange zone subsequent to the recovery therefrom of the effluent of regeneration and recirculation is carried out between said anion exchange zone and a cation exchange zone.

9. Method as recited in claim 8 in which said regeneration is carried out to provide effluent from said anion exchange zone containing about 95 percent of the hexavalent chromium present in said zone just prior to the initiation of regeneration.

10. Method as recited in claim 1 in which step (a) comprises spray washing with demineralized water.

11. Method as recited in claim 1 in which solution treated in step (b) is an aqueous solution containing cations and hexavalent chromium in the form of anions recovered from step (a) and also from other sources.

12. Method of treating aqueous solution containing cations and hexavalent chromium in the form of anions to produce an electrolyte suitable for use in a chemical treatment step in an electrotinplating line, comprising the steps of
   a. treating said aqueous solution with cation exchange resin in a cation exchange zone to replace cations with hydrogen ions to produce an aqueous effluent containing hydrogen ions and anions including anions containing hexavalent chromium;
   b. treating said effluent with anion exchange resin in an anion exchange zone to replace anions with hydroxyl ions thereby recovering hexavalent chromium in the resin in said anion exchange zone and producing a demineralized water effluent;
   c. regenerating the resin in said anion exchange zone to produce an effluent from said anion exchange zone comprising an aqueous solution containing sodium ions and anions containing hexavalent chromium;
   d. treating effluent from step (c) with cation exchange resin in a cation exchange zone to replace cations with hydrogen ions and produce an effluent and passing the produced effluent into an electrolyte storage zone;
   e. passing effluent from step (c) into an electrolyte storage zone without an intermediate cation exchange treatment.

13. Method as recited in claim 12 in which steps (d) and (e) are carried out to provide a pH ranging from 2 to 6 in said electrolyte storage zone.

14. Method as recited in claim 13 in which steps (d) and (e) are carried out to provide a pH ranging from 3 to 4 in said electrolyte storage zone.

15. Method as recited in claim 12 in which said regeneration step is carried out to provide in the effluent from the regenerating step a concentration of anions containing hexavalent chromium expressed as grams of $CrO_3$ per liter ranging from 20 to 40.

16. Method as recited in claim 15 in which said concentration ranges from 25 to 35.

* * * * *